(12) United States Patent
Caron et al.

(10) Patent No.: US 12,493,106 B2
(45) Date of Patent: Dec. 9, 2025

(54) METHOD FOR IMPLEMENTING A LIGHT DETECTION AND RANGING LIDAR DEVICE IN A MOTOR VEHICLE

(71) Applicant: Continental Automotive GmbH, Hannover (DE)

(72) Inventors: Thibault Caron, Toulouse (FR); Boris Lugez, Toulouse (FR)

(73) Assignee: CONTINENTAL AUTONOMOUS MOBILITY GERMANY GMBH, Ingolstadt (DE)

( * ) Notice: Subject to any disclaimer, the term of this patent is extended or adjusted under 35 U.S.C. 154(b) by 1366 days.

(21) Appl. No.: 17/149,943

(22) Filed: Jan. 15, 2021

(65) Prior Publication Data

US 2021/0223365 A1 Jul. 22, 2021

(30) Foreign Application Priority Data

Jan. 20, 2020 (FR) ..................................... 2000504

(51) Int. Cl.
| | |
|---|---|
| *G01C 3/08* | (2006.01) |
| *G01S 7/48* | (2006.01) |
| *G01S 7/484* | (2006.01) |
| *G01S 17/10* | (2020.01) |
| *G01S 17/89* | (2020.01) |
| *G01S 17/931* | (2020.01) |
| *G05D 1/00* | (2006.01) |

(52) U.S. Cl.
CPC ............ *G01S 7/4808* (2013.01); *G01S 7/484* (2013.01); *G01S 17/10* (2013.01); *G01S 17/89* (2013.01); *G01S 17/931* (2020.01); *G05D 1/0231* (2013.01)

(58) Field of Classification Search
CPC ........ G01S 7/4808; G01S 7/484; G01S 17/10; G01S 17/89; G01S 17/931; G01S 7/4873; G01S 7/4876; G05D 1/0231
See application file for complete search history.

(56) References Cited

U.S. PATENT DOCUMENTS

| | | |
|---|---|---|
| 2019/0235049 A1 | 8/2019 | Lai et al. |
| 2019/0391270 A1 | 12/2019 | Uehara |
| 2020/0284907 A1* | 9/2020 | Gupta ................... G01S 7/4868 |

OTHER PUBLICATIONS

French Search Report and Written Opinion for French Application No. 2000504, dated Sep. 18, 2020, 10 pages.

* cited by examiner

*Primary Examiner* — Samantha K Nickerson
(74) *Attorney, Agent, or Firm* — Buchanan Ingersoll & Rooney PC

(57) ABSTRACT

A method for implementing a LIDAR device in a motor vehicle, including the following steps: determining the number of bright nearby points of the point cloud, a bright nearby point being defined as a point that meets the following two conditions: the distance of separation corresponding to the point is less than a first predetermined distance threshold; and the light intensity corresponding to the point is higher than a first predetermined light intensity threshold; when the number of bright nearby points is higher than a predetermined crosstalk filtering activation threshold, identifying each crosstalk-related point that meets the following two conditions: the distance of separation corresponding to the point is less than a second predetermined distance threshold; and the light intensity corresponding to the point is lower than a second predetermined brightness threshold.

16 Claims, 2 Drawing Sheets

METHOD FOR IMPLEMENTING A LIGHT DETECTION AND RANGING LIDAR DEVICE IN A MOTOR VEHICLE

CROSS REFERENCE TO RELATED APPLICATIONS

This application claims priority to French Patent Application No. 2000504, filed Jan. 20, 2020, the contents of such application being incorporated by reference herein.

FIELD OF THE INVENTION

The invention relates to the field of motor vehicles and more particularly relates to LIDAR devices employed in motor vehicles.

BACKGROUND OF THE INVENTION

LIDAR (LIght Detection And Ranging) devices are devices that allow objects and other elements in the environment of a motor vehicle to be detected and the distance between the vehicle and the detected objects to be measured.

LIDAR devices employed in motor vehicles generally include a light emitter, which is designed to emit incident light rays, i.e. light rays in the direction of the environment of the vehicle. They also include a photodetector, which is designed to receive in return the light rays reflected by the objects located in the environment of the vehicle. By measuring the lengths of time that have elapsed between the emission and the reception of the light rays, and by taking into account the speed of propagation of light, LIDAR devices allow the objects surrounding the vehicle to be detected and the distance of these objects from the vehicle to be determined.

LIDAR devices are generally employed in motor vehicles to assist the driver, for example in the case of certain maneuvers or to implement cruise control systems. LIDAR devices are also used in autonomous vehicles, i.e. vehicles capable of driving autonomously without a human driver. In particular, owing to their precision, LIDAR devices are indispensable in driving systems for autonomous vehicles and allow these vehicles to perceive their surroundings, which is a crucial operation to allow the vehicle to adapt its trajectory to the environment.

The reliability of a LIDAR device, when the latter is used in a motor vehicle, is a guarantee of safety. Moreover, when a LIDAR device is employed in an autonomous vehicle, this reliability is critical since it is in particular on the latter that the safety of the passengers and of the environment of the vehicle depends.

In particular, given these safety requirements, it is imperative that any filtering of data relating to a LIDAR device must avoid false negatives, i.e. it is imperative that data filtering cannot under any circumstances delete data indicating the actual presence of an object. For example, it is out of the question for filtering of data from the LIDAR device to result in the indication that there is no object present in front of the vehicle whereas an object to be circumnavigated is actually present on the trajectory of the vehicle. In light of this, the data filtering applied to LIDAR devices is generally conservative and, in case of doubt, an object is preferably indicated as being present rather than absent. Moreover, false positives, i.e. objects that are detected by the LIDAR device but do not actually exist, can for their part lead to the vehicle behaving in an unexpected and therefore dangerous manner.

However, LIDAR devices are faced with recurrent anomalies linked to artefacts, i.e. instances of erroneous detection of objects indicating that an object is detected by the device whereas in fact there is no corresponding object actually present.

One of the main causes of artefacts is the phenomenon of crosstalk. This phenomenon is linked to the fact that the light pulses emitted by the light source are at a high power. This is because objects that are far away have to be reached by these light rays in order to detect distant objects and thus perceive the environment of the vehicle over long distances in particular for the purpose of driving anticipation. When highly reflective objects are near the vehicle, these objects create a significant source of light reflection for these powerful light emissions. The sensitive cells of the photodetector are caused to become saturated in the zone corresponding to the highly reflective object, and this saturation spreads and disrupts the adjacent cells. As a result, these adjacent cells pick up an item of information that is interpreted as the presence of an object even though there is no object in the zone corresponding to these cells.

The artefacts linked to this crosstalk phenomenon thus result in the presence of an object which does not actually exist being detected, or in two objects being considered to be one single object when the crosstalk phenomenon occurs between the two objects. The problems linked to the appearance of artefacts due to the crosstalk phenomenon are particularly undesirable and lead to disruption of the driving of the vehicle, specifically for autonomous vehicles.

Solutions for implementing light detection and ranging LIDAR devices, which solve the problems linked to artefacts due to the crosstalk phenomenon, are known. These solutions are generally based on dedicated hardware components which are expensive and the reliability of which could be improved, in particular for a critical application such as the driving of autonomous vehicles.

SUMMARY OF THE INVENTION

The aim of an aspect of the invention is to improve the methods of the prior art for implementing LIDAR devices.

To this end, an aspect of the invention relates to a method for implementing a light detection and ranging LIDAR device in a motor vehicle, including the following steps:
  emitting an incident light pulse from the motor vehicle toward its external environment;
  receiving in return, on a photodetector of the motor vehicle, a reflected light pulse;
  detecting a point cloud on the basis of the reflected light pulse;
  determining a distance of separation for each point of the point cloud.

This method further includes the following steps:
  for each point of the point cloud, measuring the light intensity received by the photodetector;
  determining the number of bright nearby points of the point cloud, a bright nearby point being defined as a point that meets the following two conditions: the distance of separation corresponding to the point is less than a first predetermined distance threshold; and the light intensity corresponding to the point is higher than a first predetermined light intensity threshold;
  when the number of bright nearby points is higher than a predetermined crosstalk filtering activation threshold, identifying each crosstalk-related point, a crosstalk-related point being defined as a point that belongs to the point cloud and meets the following two conditions: the distance of separation corresponding to the point is less than a second predetermined distance threshold; and the light intensity corresponding to the point is lower than a second predetermined brightness threshold.

The method according to an aspect of the invention makes it possible to employ a LIDAR device provided with a high-power light source which allows distant objects in the environment of the vehicle to be detected without fear of the consequences linked to the crosstalk phenomenon.

The method according to an aspect of the invention requires only standard LIDAR hardware and can employ a conventional photodetector even if this photodetector has a tendency to become saturated when a highly reflective object that is near the vehicle is detected.

The method according to an aspect of the invention nevertheless allows efficient filtering of the artefacts linked to the crosstalk phenomenon by using minimal computational resources, in particular compatible with real-time applications. No specific hardware component is required for this purpose.

The method according to an aspect of the invention implements two-pass filtering which provides for high filtering reliability, resulting in a negligible false negative rate, by first verifying the presence of a crosstalk phenomenon before identifying the crosstalk-related points. This identification ensures that the points thus identified do not correspond to a real object in the environment of the vehicle and are indeed an artefact. If there is no crosstalk phenomenon, no filtering will be applied, which limits false negatives.

The method according to an aspect of the invention may include the following additional features, alone or in combination:
- the method includes the additional step of excluding the crosstalk-related points from the point cloud;
- the light intensity of each point of the point cloud is measured by measuring the brightness received by the photodetector;
- the first predetermined light intensity threshold is expressed in lux;
- the second predetermined light intensity threshold is expressed in lux;
- the light intensity of each point of the point cloud is measured by measuring the albedo corresponding to each point, by determining the ratio of the reflected light energy received by the photodetector to the incident light energy emitted by the light source;
- the first predetermined light intensity threshold has an albedo value of 90%;
- the second predetermined light intensity threshold has an albedo value of 10%;
- during the step of determining the number of bright nearby points of the point cloud, an incremental counter is incremented for each detected nearby bright point, the step of identifying each crosstalk-related point being implemented when the incremental counter exceeds the crosstalk filtering activation threshold value;
- the first predetermined distance threshold is 7 meters;
- the second predetermined distance threshold is 12 meters;
- the crosstalk filtering activation threshold is 60 points.

BRIEF DESCRIPTION OF THE DRAWINGS

Other features and advantages of an aspect of the invention will become apparent from the following non-limiting description, with reference to the appended drawings, in which.

DETAILED DESCRIPTION OF THE PREFERRED EMBODIMENTS

Figure 1:
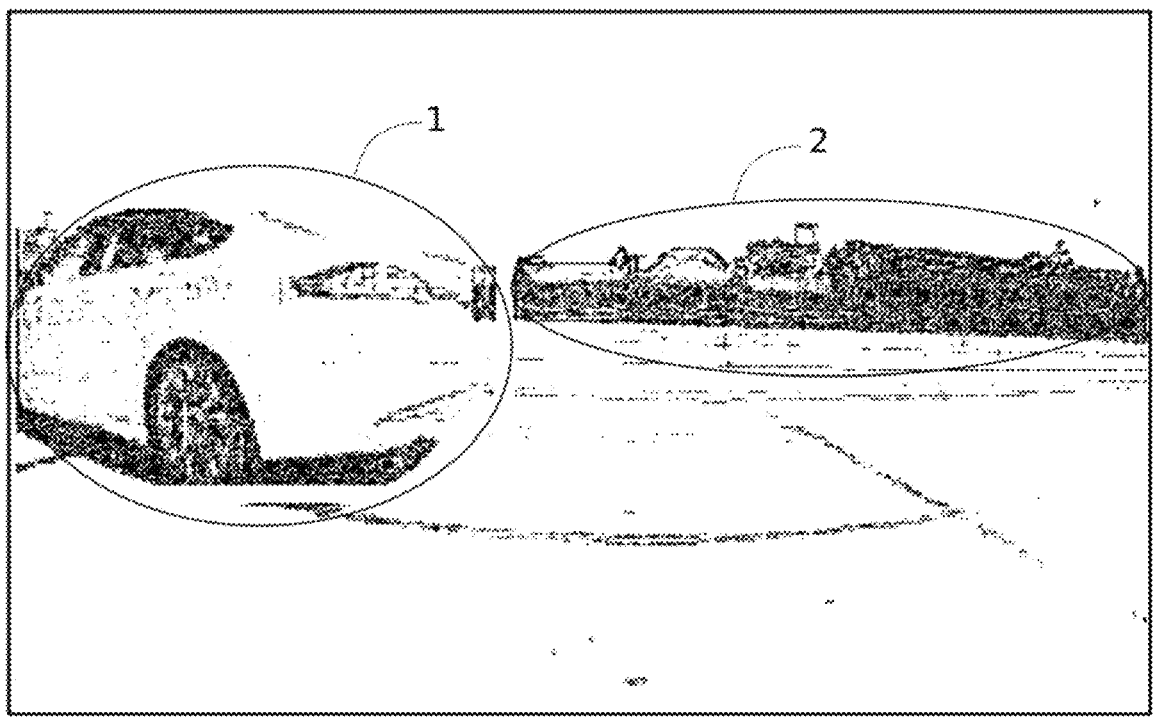
FIG. 1 is an illustrative example of the environment of an autonomous vehicle.
Figure 2:
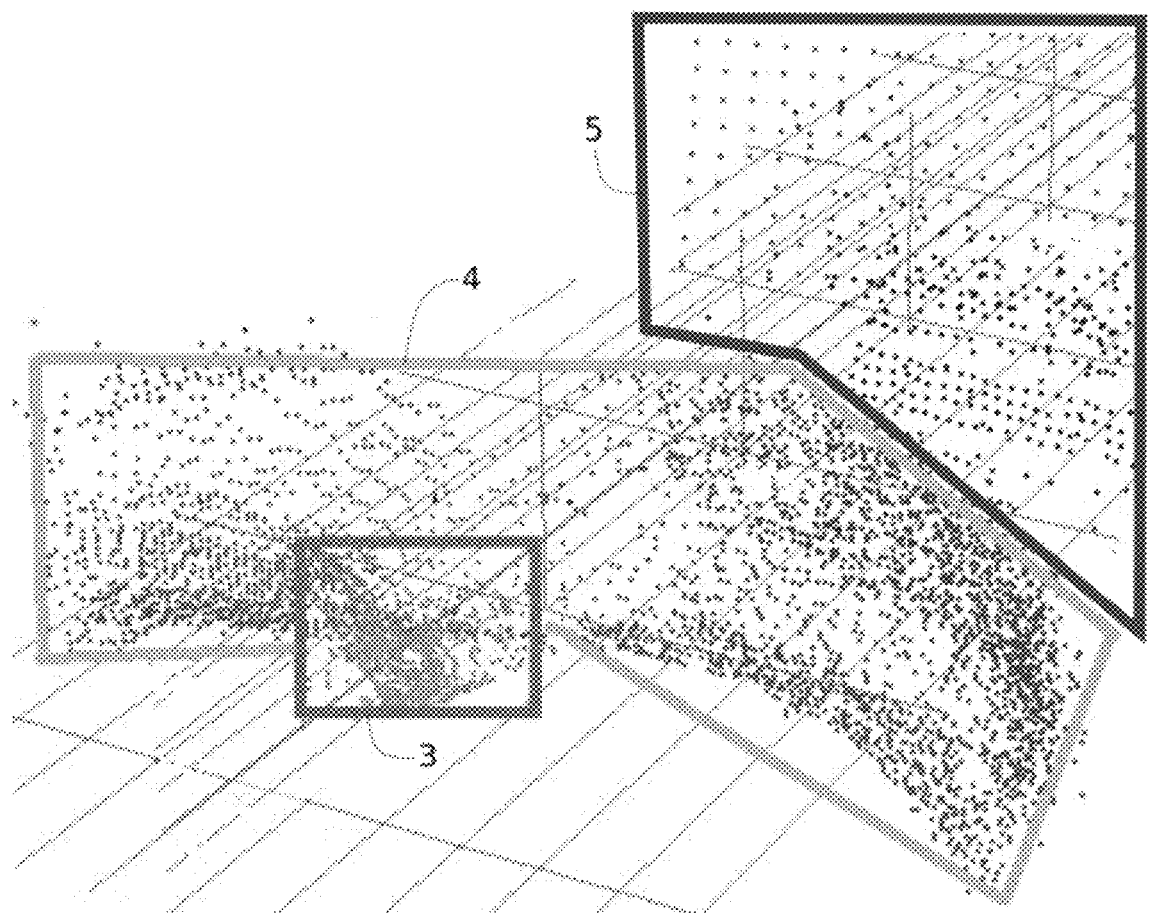
FIG. 2 illustrates a point cloud corresponding to the environment of FIG. 1, detected by a LIDAR device of the autonomous vehicle.

FIGS. 1 and 2 illustrate an example of a situation producing an undesirable crosstalk phenomenon when a light detection and ranging LIDAR device is implemented.

In this illustrative example, an autonomous vehicle is provided, in a known manner, with a LIDAR device allowing digital information representative of the environment in which the vehicle is traveling to be obtained in order to allow this vehicle to be driven safely.

FIG. 1 illustrates an instant in the journey of the autonomous vehicle. The vehicle is located in an environment in which a vehicle 1 is situated in the foreground and in which various buildings 2 appear in the background. FIG. 1 schematically depicts the scene as it would look viewed from the autonomous vehicle (camera image of the scene).

The LIDAR device with which the autonomous vehicle is provided emits incident light pulses directed toward the environment of the autonomous vehicle and, in this example, in a particular direction (for example toward the front of the vehicle or laterally, toward one of the sides of the vehicle). Reflected light pulses, which are created by the incident light pulses being reflected from the objects located around the autonomous vehicle, are then received in return on a photodetector of the LIDAR device.

Light detection and ranging LIDAR devices are known from the prior art, and their general operation will not be described in greater detail here. The present description relates to a method for implementing a LIDAR device of this kind while avoiding crosstalk phenomena.

In the example of FIG. 1, the vehicle 1 located in the foreground includes bodywork that is for example white or a light metallic color and is highly reflective of light. The LIDAR device of the autonomous vehicle emits high-power light pulses such that the range thereof can be long enough to reach, in this example, the buildings 2. In this case, the high power of the light emissions from the LIDAR device results in intense reflection from the bodywork of the vehicle 1 in the foreground, which is located, in this example, less than 10 meters away from the autonomous vehicle.

FIG. 2 illustrates the point cloud obtained by the LIDAR device in response to the scene illustrated in FIG. 1. This three-dimensional point cloud is composed of as many points as there are reflected light rays received by the photodetector. Each point generally corresponds to a sensitive cell of the photodetector.

For each point of the point cloud in FIG. 2, the LIDAR device determines the distance of separation from the object corresponding to the point, i.e. from the object from which an incident light ray has been reflected to produce the detection of a point by a sensitive cell of the photodetector.

A value representative of the light intensity is also determined for each point of the point cloud, by means of the photodetector. The light intensity can, for example, be determined by measuring the brightness received by the photodetector or, for example, by determining the relative value of the albedo, which corresponds to the ratio of the received light intensity to the emitted light intensity.

In the simplified example of FIG. 2, the LIDAR device determines, for the scene in FIG. 1, a point cloud composed of:
- a first group of points illustrated in box 3, corresponding to the vehicle 1 in the foreground;
- a second group of points 4 located just behind the first group of points 3;
- a third group of points 5 located in the background, corresponding to the buildings 2 in the background.

The first and third groups of points 3, 5 are legitimate and correspond to real objects. In this example, the vehicle 1 in the foreground illustrates an obstacle to be circumnavigated, and the buildings 2 in the background illustrate the environment in which the vehicle is traveling.

The second group of points 4 is, for its part, the result of a crosstalk phenomenon created by the highly reflective nature of the bodywork of the vehicle 1 in the foreground. The reflected light rays that reach the photodetector in the zone corresponding to the first group of points 3 are so bright that they saturate the pixels of the photodetector and lead to an increase in the brightness perceived by the adjacent pixels in the zone corresponding to the second group of points 4. This crosstalk phenomenon leads to the detection of the second group of points 4 by the LIDAR device, said second group of points, if it is taken into account, indicating to the autonomous vehicle that there is a large obstacle, which does not actually exist, in the environment of the vehicle.

Figure 3:
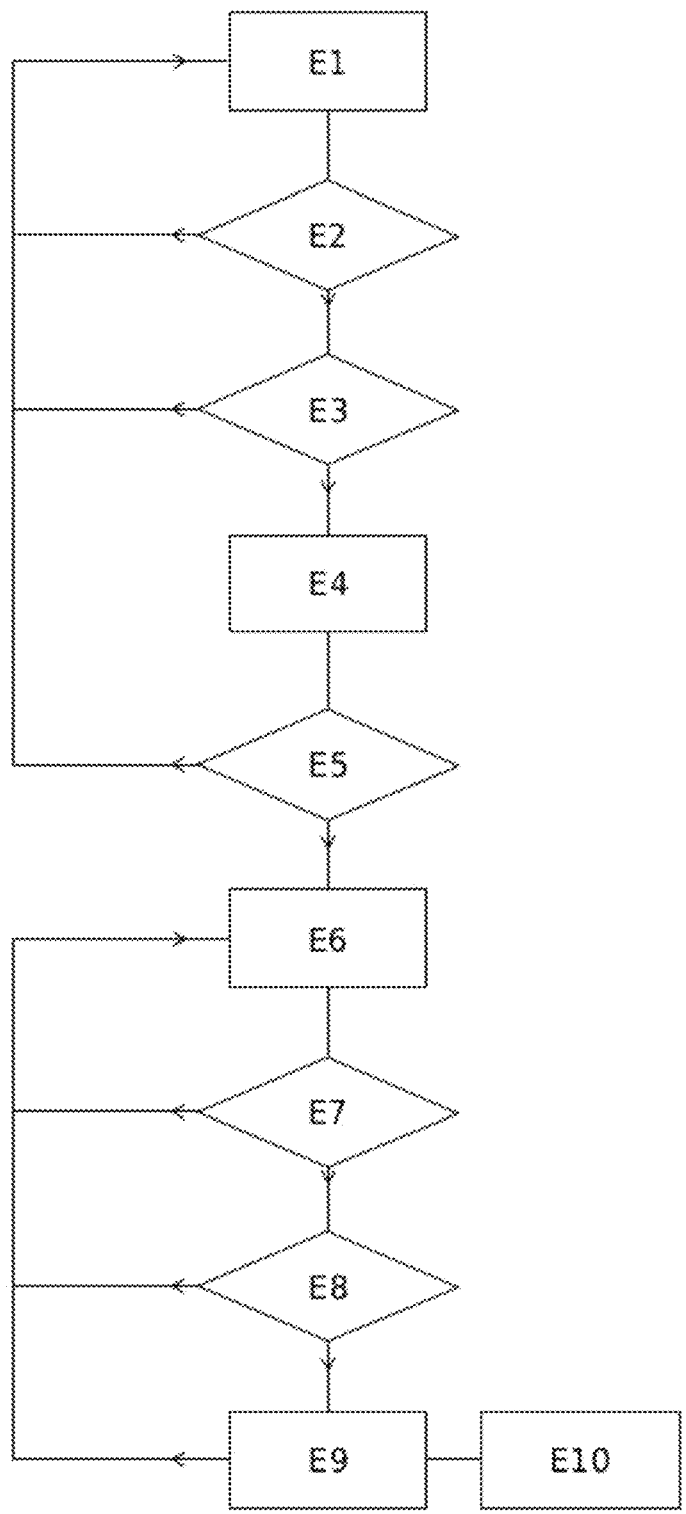
FIG. 3 is a diagram illustrating the method according to an aspect of the invention.

According to an aspect of the present invention, the LIDAR device is a conventional device without any hardware means for filtering, and the point cloud illustrated in FIG. 2 is the actual point cloud obtained by the LIDAR device. However, the method for implementing this LIDAR device allows the crosstalk-related points, which in the present case are included in the second group of points 4, to be identified. This method is described with reference to FIG. 3.

The method first of all implements the LIDAR device in a conventional manner by means of the following steps:
- emitting an incident light pulse from the motor vehicle toward its external environment;
- receiving in return, on a photodetector of the motor vehicle, a reflected light pulse;
- detecting a point cloud on the basis of the reflected light pulse;
- determining a distance of separation for each point of the point cloud.

In addition to the distance of separation for each point of the point cloud, the light intensity received by the photodetector for each of the points is also determined.

The method then includes (see FIG. 3) a first phase (steps E1 to E5) that makes it possible to determine whether crosstalk filtering should be activated. The method further includes a second phase (steps E6 to E10) of actual filtering, which allows the crosstalk-related points to be identified, this phase being implemented only when it is deemed to be necessary on completion of the first phase.

Starting from the complete point cloud as illustrated in FIG. 2, the method starts with a first step E1, during which one of the points of this point cloud is selected. This point will be subjected to the operations of steps E1 to E5, and the method will loop back to step E1 to select another point of the point cloud, which will in turn be subjected to steps E1 to E5. The first phase is thus executed sequentially.

In a second step E2, the distance of separation corresponding to the selected point (i.e. the distance of separation between the object corresponding to the selected point and the autonomous vehicle) is compared to a first predetermined distance threshold. The first predetermined distance threshold corresponds to a distance between the autonomous vehicle and an object which is short enough that, if this object has a reflective surface conducive to the crosstalk phenomenon, this phenomenon will definitely occur. In the present example, the first predetermined distance threshold is 7 meters. In other words, if a sufficiently reflective object is located at a distance of less than 7 meters away from the autonomous vehicle, it is certain that a crosstalk phenomenon will occur.

During step E2, if the distance of separation is greater than the first predetermined distance threshold, the method ends the first phase here for the selected point and returns to step E1 to select a new point of the point cloud. If the distance of separation is less than the first predetermined distance threshold, the method then moves on to step E3.

In step E3, the light intensity corresponding to the selected point is compared to a first predetermined light intensity threshold. The first predetermined light intensity threshold corresponds to a light intensity beyond which it is certain that a crosstalk phenomenon will occur for a point corresponding to a nearby object (at a distance of separation less than the first predetermined distance threshold). In the present example, the first predetermined light intensity threshold has an albedo value of 90%, i.e. the reflected light energy is 90% of the incident light energy. This first predetermined brightness threshold can also be expressed in lux, if a photodetector which provides a brightness value in lux is used.

During step E3, if the light intensity is lower than the first predetermined light intensity threshold, the method ends the first phase here for the selected point and returns to step E1 to select a new point of the point cloud. If the light intensity is higher than the first predetermined light intensity threshold, the method then moves on to step E4.

In step E4, the selected point, which has just been subjected to steps E2 and E3, is identified as a bright nearby point. In step E4, a bright nearby point counter is incremented.

The method then moves on to a step E5, which checks whether the bright nearby point counter has reached a value higher than a predetermined threshold known as the "crosstalk filtering activation threshold". In step E5, if the bright nearby point counter has a value lower than the crosstalk filtering activation threshold, the method returns to step E1 to select a new point of the point cloud, in order to implement the first phase with this new point. If, in step E5, the counter for the number of bright nearby points has a value higher than the crosstalk filtering activation threshold, the method moves on to the second phase, which starts with step E6. In the present example, the crosstalk filtering activation threshold is 60 points.

If all the points of the point cloud are subjected to the first phase of the method, and the bright nearby point counter remains lower than the crosstalk filtering activation threshold, the second phase is not implemented and the method thus determines that the conditions for the appearance of crosstalk phenomena are not met. The point cloud is then used as is for the remainder of the vehicle driving operations.

When the second phase of the method is implemented, i.e. when the bright nearby point counter reveals that there is a large enough number of points likely to cause a crosstalk phenomenon, the second phase of the method then consists in identifying the points of the point cloud that are actually the result of a crosstalk phenomenon.

All the points of the point cloud will then sequentially be subjected to the second phase of the method. The first step E6 of the second phase consists in selecting one of the points of the point cloud.

In a second step E7 of this second phase, the distance of separation of the selected point is compared with a second predetermined distance threshold. This second predetermined distance threshold corresponds to a distance range in which, if an artefact linked to a crosstalk phenomenon appears, this artefact will necessarily occur within this distance range. Since the crosstalk phenomenon-related points of the point cloud are generally located behind (i.e. at a slightly greater distance than) the points related to the real object that has caused the crosstalk phenomenon, the second predetermined distance threshold is at least equal to, and preferably slightly greater than, the first predetermined distance threshold. In the present example, the second predetermined distance threshold is 12 meters.

In step E7, if the distance of separation of the selected point is greater than the second predetermined distance threshold, the method returns to step E6 for the selection of a new point of the point cloud. In step E7, if the distance of separation of the selected point is less than the second predetermined distance threshold, the method moves on to step E8, in which the light intensity of the point is compared with a second predetermined brightness threshold.

In step E8, if the light intensity of the selected point is higher than the second predetermined brightness threshold, the method returns to step E6 for the selection of a new point of the point cloud. If the light intensity of the point is lower than the second predetermined brightness threshold, the method moves on to a step E9, in which this point is identified as being a crosstalk phenomenon-related point.

The points resulting from a crosstalk phenomenon (i.e. the points of the second group of points 4 in FIG. 2) have the particular feature of being within a range of distance close to the autonomous vehicle and of having a low level of brightness. In the present example, the second predetermined brightness threshold is 10% if the light intensity is measured in terms of albedo. This second predetermined brightness threshold can also be expressed in lux, if a photodetector which provides a brightness value in lux is used.

In step E9, the selected point, after having moved to steps E7 and E8 of the second phase, is thus identified as a point resulting from a crosstalk phenomenon, which thus does not correspond to a real object in the environment of the autonomous vehicle. After step E9, the method returns to step E6 to select a new point of the point cloud, and the second phase of the method continues in this way for all the points of the point cloud. When all the points of the point cloud have been subjected to the second phase, the method then moves on to step E10, during which a list of all the crosstalk phenomenon-related points of the point cloud is drawn up on the basis of the points individually identified as crosstalk-related points in step E9.

The LIDAR device thus has the list of all the crosstalk phenomenon-related points of the point cloud. This list can be used to adapt the driving of the vehicle on the basis of the crosstalk phenomena and in particular to identify the artefacts liked to these phenomena and, for example, not to take these into account for the driving of the vehicle.

Preferably, in step E10, the points identified as crosstalk phenomenon-related points are deleted from the point cloud and are not taken into account by the driving system of the vehicle.

Variants of the method may be implemented without departing from the scope of an aspect of the invention. In particular, the first and second predetermined distance thresholds and also the first and second predetermined brightness thresholds may be adapted to a particular environment or vehicle, and several sets of these thresholds may be implemented depending, for example, on weather conditions or another parameter.

The method may moreover be implemented in any type of vehicle or machine.

The invention claimed is:

1. A method for implementing a light detection and ranging LIDAR device in a motor vehicle, comprising:
   emitting an incident light pulse from the motor vehicle toward its external environment;
   receiving in return, on a photodetector of the motor vehicle, a reflected light pulse;
   detecting a point cloud on the basis of the reflected light pulse;
   determining a distance of separation for each point of the point cloud;
   for each point of the point cloud, measuring the light intensity received by the photodetector;
   determining the number of bright nearby points of the point cloud, a bright nearby point being defined as a point that meets the following two conditions: the distance of separation corresponding to the point is less than a first predetermined distance threshold; and the light intensity corresponding to the point is higher than a first predetermined light intensity threshold; and
   when the number of bright nearby points is higher than a predetermined crosstalk filtering activation threshold, identifying each crosstalk-related point, a crosstalk-related point being defined as a point that belongs to the point cloud and meets the following two conditions: the distance of separation corresponding to the point is less than a second predetermined distance threshold; and the light intensity corresponding to the point is lower than a second predetermined brightness threshold.

2. The method as claimed in claim 1, further comprising excluding the crosstalk-related points from the point cloud.

3. The method as claimed in claim 2, wherein the light intensity of each point of the point cloud is measured by measuring the brightness received by the photodetector.

4. The method as claimed in claim 2, wherein the light intensity of each point of the point cloud is measured by measuring the albedo corresponding to each point, by determining the ratio of the reflected light energy received by the photodetector to the incident light energy emitted by the light source.

5. The method as claimed in claim 1, wherein the light intensity of each point of the point cloud is measured by measuring the brightness received by the photodetector.

6. The method as claimed in claim 5, wherein the first predetermined light intensity threshold is expressed in lux.

7. The method as claimed in claim 6, wherein the second predetermined light intensity threshold is expressed in lux.

8. The method as claimed in claim 5, wherein the second predetermined light intensity threshold is expressed in lux.

9. The method as claimed in claim 1, wherein the light intensity of each point of the point cloud is measured by measuring the albedo corresponding to each point, by determining the ratio of the reflected light energy received by the photodetector to the incident light energy emitted by the light source.

10. The method as claimed in claim 9, wherein the first predetermined light intensity threshold has an albedo value of 90%.

11. The method as claimed in claim 10, wherein the second predetermined light intensity threshold has an albedo value of 10%.

12. The method as claimed in claim 9, wherein the second predetermined light intensity threshold has an albedo value of 10%.

13. The method as claimed in claim 1, wherein, during the step of determining the number of bright nearby points of the point cloud, an incremental counter is incremented for each detected nearby bright point, the step of identifying each crosstalk-related point being implemented when the incremental counter exceeds the crosstalk filtering activation threshold value.

14. The method as claimed in claim 1, wherein the first predetermined distance threshold is 7 meters.

15. The method as claimed in claim 1, wherein the second predetermined distance threshold is 12 meters.

16. The method as claimed in claim 1, wherein the crosstalk filtering activation threshold is 60 points.

\* \* \* \* \*